United States Patent
Heyns

Patent Number: 5,535,623
Date of Patent: Jul. 16, 1996

[54] TIRE PRESSURE INDICATOR

[76] Inventor: Hermanus E. Heyns, 246 Klip Street, Vryheid, Natal Province, South Africa

[21] Appl. No.: 324,027

[22] Filed: Oct. 14, 1994

[51] Int. Cl.[6] .......................... B60C 23/02; B60C 23/06
[52] U.S. Cl. .................. 73/146.8; 73/146.2; 73/146.3; 116/34 R
[58] Field of Search .................... 73/146.2, 146.3, 73/146.8; 116/34 R

[56] References Cited

U.S. PATENT DOCUMENTS

| | | | |
|---|---|---|---|
| 1,010,726 | 12/1911 | Collins | 116/34 R |
| 1,298,538 | 3/1919 | Meyer et al. | 116/34 R |
| 2,343,582 | 3/1944 | Rist | 73/146.8 |
| 2,709,983 | 6/1955 | Divietro | 116/34 R |
| 4,155,325 | 5/1979 | Yu | 116/34 |
| 5,027,740 | 7/1991 | Kramer et al. | 116/34 |

FOREIGN PATENT DOCUMENTS

| | | |
|---|---|---|
| 44235/93 | 2/1994 | Australia. |
| 255850 | 11/1992 | United Kingdom. |
| WO8201166 | 4/1982 | WIPO. |

Primary Examiner—Richard Chilcot
Assistant Examiner—Paul D. Amrozowicz
Attorney, Agent, or Firm—Christie, Parker & Hale

[57] ABSTRACT

A tire pressure indicator is provided which has a screw-threaded socket for long term but removable association with a tire valve. The body of the indicator houses a movable operator member; actuator member; and resilient member located between the operator member and actuator member. The arrangement is such that the actuator member is held in a "rest" position by the resilient means which is compressed when the actuator member is moved to a "test" position. The degree of compression and resilience of the resilient means are arranged such that the air release pin of the tire valve is depressed only in the event of air pressure in the tire being inadequate to counter the force exerted thereon through the resilient means. The sound of the air escaping in the "test" position is indicative of a low tire pressure.

11 Claims, 1 Drawing Sheet

TIRE PRESSURE INDICATOR

FIELD OF THE INVENTION

This invention relates to a tire pressure indicator and, more particularly, to an indicator for releasable, but long term association with a motor vehicle pneumatic tire valve for the specific purpose of enabling a simple check to be carried out as to whether or not the tire is under-inflated.

BACKGROUND OF THE INVENTION

It is well known that extremely dangerous conditions can arise when a vehicle, in particular a transport vehicle which may be heavily loaded, has one or more under-inflated tires. This can lead to overheating of the tires with subsequent blow-outs and the possibility of accidents. Also, in the case of double wheels, it may lead to one tire becoming substantially flat and the sidewalls of the two tires rubbing against each other thereby destroying both tires. Irrespective of this dangerous situation, the cost of the tires alone is substantial.

Numerous different attempts have been made at providing tire pressure monitoring and indicating devices, generally for permanent or long term association with pneumatic tires, or a vehicle fitted with such tires, for the purpose of enabling under-inflated tires to be easily and swiftly detected.

Many of the prior proposals have involved rather complicated electronic arrangements in which information as to whether or not a tire is under-inflated is conveyed from a wheel, by electromagnetic radiation or magnetic fields, to a receiver on the body, the receiver being coupled to a control unit for informing a driver of the situation. While some of these devices have indeed operated effectively, they are not favoured, and suffer from various disadvantages in different localities.

It is applicant's belief that the problem can be substantially alleviated simply by checking the tires of a vehicle before embarking on a journey as, for the most part, an under-pressure tire will generally be capable of detection at that stage.

It is, however, unlikely that a driver of a vehicle will be in possession of a pocket pressure gauge to check the tires. Also, the removal and replacement of the valve caps is tedious.

It is, accordingly, the object of this invention to provide a tire pressure indicator of simple construction which can be in long term association with a tire valve, and whereby the manual checking whether or not the associated tire is under-inflated is rendered extremely simple.

SUMMARY OF THE INVENTION

In accordance with this invention there is provided a tire pressure indicator comprising a body assembly having a screw-threaded socket for attachment to a tire valve, a movable operating member arrangement associated with the body and operatively in alignment with the valve release pin of a tire valve, an actuator member held captive relative to the body and movable relative thereto between two positions, one being a rest position and the other being a test position, resilient means interposed between the actuator member and operating member arrangement such that movement of the actuator member from its rest position to its test position causes movement of the operating member arrangement to contact the valve release pin and the resilient means to deform to a predetermined extent and wherein the resilient means is chosen or adjusted such that, in the test position of the actuator member, air will be released from the tire valve if inadequate pressure is present in the tire to withstand the said deformation of the resilient means.

Further features of the invention provide for the body assembly to be tubular and co-axial with the socket; for the operating member arrangement to include a cylindrical element movable within the tubular body and having, or co-operating with, a central axially extending projection for engaging the release pin of a tire valve; for the actuator member to be an axially movable member at the end of the tubular body assembly opposite the socket and having a headed operating stem extending axially out of the end of the body; for the body to have a small air outlet passage optionally shaped or adapted to create an audible sound when air passes therethrough; and for the resilient means to be a calibrated helical compression spring positioned between the operating member and actuating member in the tubular body which, in this case, may be a single piece tubular body.

As an alternative to using calibrated springs, the amount of deformation of the resilient means in the test position of the operating member arrangement may be made adjustable. This enables an uncalibrated resilient means to be employed and set to the required "pressure".

In the case of the tubular body co-axial with the socket, this can most easily be achieved by making the length of the body adjustable. This may be done by making the body in two parts having interengaging screw-threaded spigot and socket formations and a lock nut for locking the two body parts in the required relative positions.

In order that the invention may be more fully understood, two embodiments thereof will now be described with reference to the accompanying drawings.

DETAILED DESCRIPTION WITH REFERENCE TO THE DRAWINGS

Figure 1:
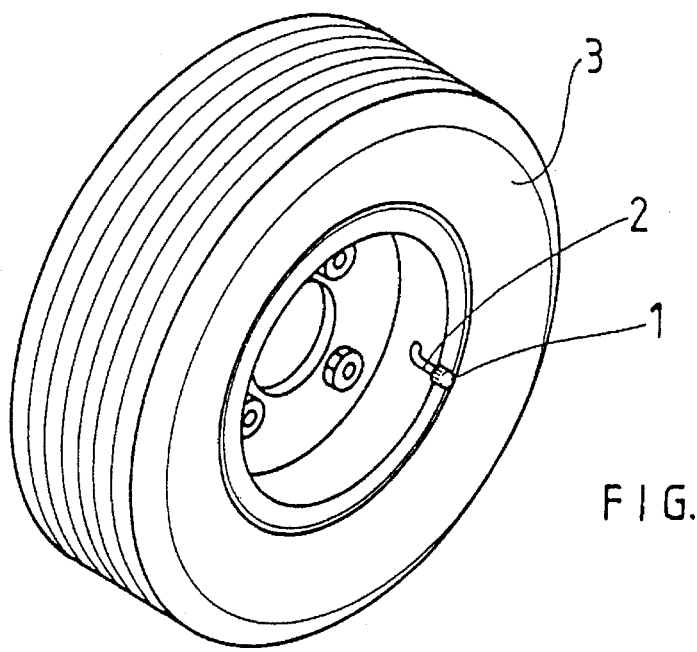
FIG. 1 illustrates a motor vehicle tire and wheel fitted with a pressure indicator according to this invention.
Figure 2:
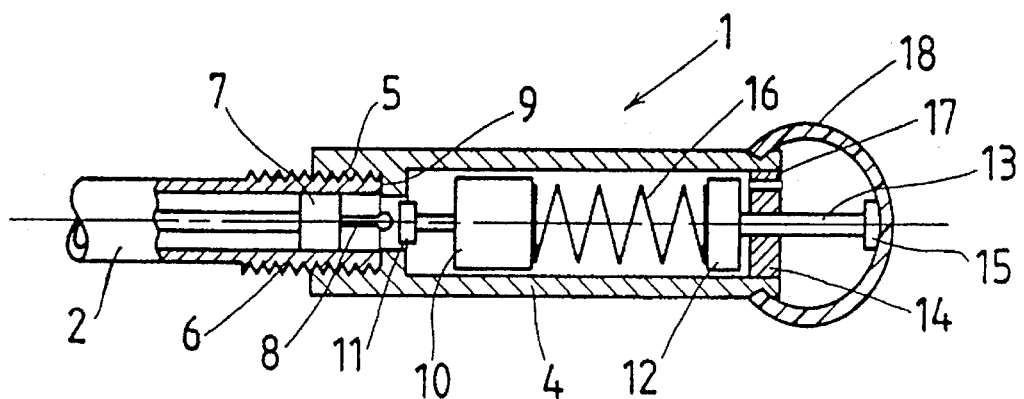
FIG. 2 is a longitudinal sectional elevation of a simple indicator according to the invention in association with a tire valve and wherein a calibrated spring is employed.

As illustrated in FIGS. 1 and 2 of the drawings, a tire pressure indicator, generally indicated by numeral 1, is adapted to be fitted, on a long term basis, on the valve stem 2 of tire 3.

To this end, in the case of the embodiment of the invention illustrated in FIG. 2, the pressure indicator has a tubular body 4 having a co-axial screw-threaded socket 5 at one end thereof adapted to be fitted onto the externally screw-threaded end 6 of the valve stem 2 which is fitted with a tire valve 7 having a co-axial release pin 8 therein.

An inwardly directed flange 9 is provided at the inner end of the screw-threaded socket so that it can abut the end face of the screw-threaded end of the valve stem.

An operating member 10 having a pin engaging projection 11 is fitted so as to be axially movable in the body. The operating member conveniently assumes the form of a loose plunger, movable axially in the body so that the end of the projection 11 can engage the end of the valve release pin 8 in the operative condition.

At the other end of the tubular body is an axially movable actuating member 12 having an operating stem 13 extending out of the end 14 of the body and provided with a head 15 so that the stem can be pushed into the tubular body to a predetermined extent governed by the head and the length of the stem 13.

A calibrated helical compression spring 16 is positioned between the operating member and actuating member and the end 14 of the body is provided with a small outlet passage 17.

The calibrated spring 16 is chosen such that, when the stem 13 is fully depressed so that the head engages the end 14 of the body, the spring urges the operating member to a condition in which the projection 11 contacts the valve release pin 8 of the valve, and the spring becomes compressed so that a predetermined force is exerted on the pin 8.

The tire valve itself operates on the basis that it is urged to a closed condition by a helical compression spring (not shown), in the usual way, but is also held in a closed position by the pressure within the tire. The spring 16 is chosen such that, in the event that the pressure within the tire exerts insufficient pressure on the tire valve from the inside, the force exerted by the projection of the operating member on the pin 8, as a result of the compression of the calibrated spring 16 will cause the valve to open, and an audible hiss, or the like, will be heard.

On the other hand, if sufficient pressure exists within the tire the valve will be held in a closed condition against the force exerted on the pin by the projection 11 of the operating member 10, and no air will escape. Calibrated springs can be chosen according to the pressure required within a tire.

In the embodiment of the invention illustrated in FIG. 2, the air will escape through the small outlet passage 17 which may be configured such that a shrill audible sound is emitted, should this be required.

In order to protect the interior of the unit against the ingress of dust and moisture, an elastomeric cap 18 may be installed over the end of the body remote from the socket such that it covers the entire stem 13 and associated head 15 as well as the outlet from the passage 17.

It will be understood that the invention provides an extremely simple indicator which simply needs the stem 13 to be fully depressed into the body in order to check whether or not a tire is under-inflated. Where required, extension tubes can be provided for carrying the indicator provided by this invention in the event that the tire valves are not conveniently accessible.

Figure 3:
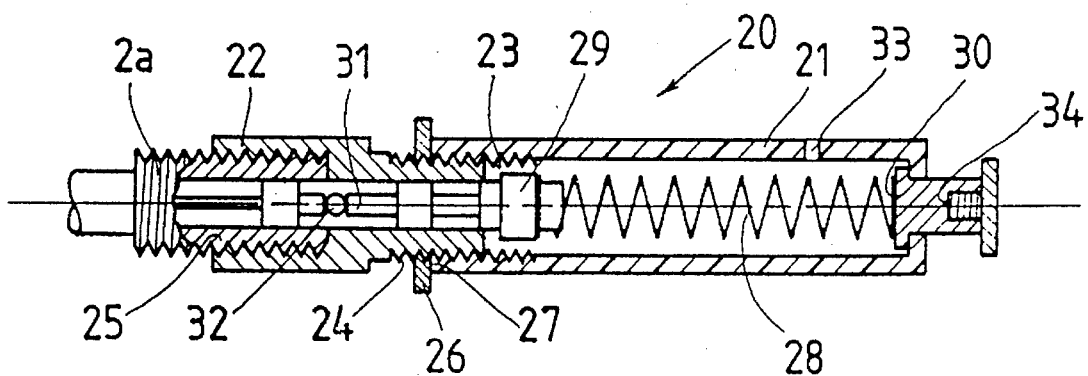
FIG. 3 is a view similar to FIG. 2 but of a second embodiment of the invention in which the spring's effect is adjustable in order to enable the correct "pressure" to be set, as may be required.

Turning now to the embodiment of the invention illustrated in FIG. 3, the tire pressure indicator is modified in a manner which enables uncalibrated springs to be used and, indeed, a single spring to be used for a range of different tire pressures.

In this case the body, generally indicated by the numeral 20, is composed of two parts 21 and 22. The one part 21 is substantially the same as that described above with reference to FIG. 2 except that it terminates in an internally screw-threaded socket connection 23 which receives a screw-threaded spigot formation 24 on the second body part 22. The second body part 22 has the internally screw-threaded socket 25 for connection to the valve stem 2a.

The screw-threaded spigot 24, and its co-operating socket 23, are made to a sufficient length such that the effective length of the body can be varied simply by rotating the two parts relative to each other to either increase or decrease the effective length of the body. A lock nut 26 positioned on the spigot adjacent the end 27 of the first body part enables the body to be locked in any effective degree of extension thereof.

In this case the helical compression spring 28 has an operating fitting 29 in its end remote from the actuator member 30 and this operator fitting co-operates with one end of an axially movable captive elongate operating member 31 contained in the second body part 22. It is the latter operating member 31 which contacts the valve release pin 32 under operative conditions.

Indeed, it has been found that the second body part 22 and its associated axially movable operating member 31 can be constituted by a commercially available extension fitting for tire valves.

In this case the outlet passage 33 is in the sidewall of the first body part.

It will be understood that, in use, this second embodiment of the invention will operate in a substantially identical manner to that described above. However, in order to set the valve indicator unit, the indicator is fitted to a tire which has previously been adjusted to the correct tire pressure. The lock nut is released and the length of the body is adjusted by rotating the first body part relative to the second body part, as may be required, until such time as a position is reached where the depression of the operating stem 34, to its full extent, just fails to cause release of air from the valve. In other words, a position is found where a slight increase in length of the body causes a change from the condition where air is released upon actuation of the actuator member to a position where air is not thus released.

The length of the indicator body is then locked in that position by means of the lock nut 26. For this purpose it is adequate to knurl the outer surfaces of the relevant body parts and lock nut as no substantial force is necessary to effectively lock the unit in its set condition.

It will be understood that this embodiment of the invention therefore requires no calibration of springs and also, a single spring can be used to test tire pressures over a limited range thereof.

It will be understood that numerous variations may be made to the embodiment of the invention described above without departing from the scope of this invention. In particular, the configuration of the spring may be varied widely, and the spring need not be a helical spring but could be a leaf spring with a different operating member and actuating member arrangement being provided.

What is claimed is:

1. A tire pressure indicator comprising:

a body assembly having a screw-threaded socket for attaching to a tire valve having a valve release pin;

a movable operating member associated with the body assembly and operatively in alignment with the valve release pin of the tire valve;

an actuator member held captive relative to the body assembly and movable relative thereto between a rest position and a test position;

resilient means interposed between the actuator member and operating member such that movement of the actuator member from the rest position to the test position causes movement of the operating member to contact the valve release pin and the resilient means to deform to a predetermined extent; and wherein the resilient means comprises a resiliency, such that, in the test position of the actuator member, air will be released from the tire valve when inadequate pressure is present in the tire to withstand the said deformation of the resilient means.

2. A tire pressure indicator as claimed in claim 1 wherein the body assembly is tubular and co-axial with the socket.

3. A tire pressure indicator as claimed in claim 1 wherein the operating member includes a cylindrical element movable within the body assembly and having a central axially extending projection for engagement with the release pin of a tire valve.

4. A tire pressure indicator as claimed in claim 2 wherein the actuator member comprises an axially movable member at an end of the tubular body assembly opposite the socket and having a headed operating stem extending axially out of the end of the tubular body assembly.

5. A tire pressure indicator as claimed in claim 2 which the resilient means comprises a helical compression spring.

6. A tire pressure indicator as claimed in claim 5 wherein the spring is calibrated and the body assembly is a single piece tubular body assembly having the socket formed at a end thereof opposite the actuator member.

7. A tire pressure indicator as claimed in claim 2 wherein the body assembly is made in two parts movable relative to each other to adjust the effective length of the body assembly and thereby adjust the effect of the resilient means on the operating member with the actuator member in the test position.

8. A tire pressure indicator as claimed in claim 7 wherein one of the body assembly parts comprises a screw-threaded socket for receiving a co-axial co-operant spigot carried by the other body assembly part, said spigot comprising a lock nut for locking the two body assembly parts against relative rotation.

9. A tire pressure indicator as claimed in claim 8 wherein each of said body assembly part comprises a captive, axially movable operating member for cooperating with one another.

10. A tire pressure indicator as claimed in claim 1 wherein said body assembly comprises a small outlet passage for air received within the body assembly from the tire valve.

11. A tire pressure indicator as claimed in claim 10 wherein the outlet passage is shaped to create an audible sound when air passes therethrough.

\* \* \* \* \*

UNITED STATES PATENT AND TRADEMARK OFFICE
CERTIFICATE OF CORRECTION

PATENT NO. : 5,535,623
DATED : July 16, 1996
INVENTOR(S) : Hermanus E. Heyns

It is certified that error appears in the above-indentified patent and that said Letters Patent is hereby corrected as shown below:

Column 5, line 18, after "claim 2" replace "which" with -- wherein --.
Column 5, line 21, before "the body" delete "the spring is calibrated and".
Column 5, line 22, after "formed at" change "a" to -- an --.

Signed and Sealed this

Seventh Day of October, 1997

Attest:

BRUCE LEHMAN

Attesting Officer

Commissioner of Patents and Trademarks